(12) United States Patent
Maher

(10) Patent No.: US 6,926,287 B1
(45) Date of Patent: Aug. 9, 2005

(54) STROLLER ASSEMBLY

(76) Inventor: Bernard P. Maher, 54-18 63rd Pl., Maspeth, NY (US) 11378

( * ) Notice: Subject to any disclaimer, the term of this patent is extended or adjusted under 35 U.S.C. 154(b) by 0 days.

(21) Appl. No.: 10/661,423

(22) Filed: Sep. 15, 2003

(51) Int. Cl.$^7$ ................................................ B62B 5/02
(52) U.S. Cl. ..................................... 280/5.26; 280/47.4
(58) Field of Search ................. 180/8.1–8.4; 280/642, 280/657, 658, 47.38–47.41, 5.2, 5.26, 5.28; D12/128–131, D12/133

(56) References Cited

U.S. PATENT DOCUMENTS

| | | | | |
|---|---|---|---|---|
| 1,887,427 | A | * | 11/1932 | Porcello ..................... 280/5.28 |
| 2,498,445 | A | * | 2/1950 | Pascoo ....................... 280/5.26 |
| 2,498,465 | A | | 2/1950 | Thomas |
| 3,214,184 | A | * | 10/1965 | Kemm ....................... 280/5.26 |
| 3,269,741 | A | * | 8/1966 | Porcello .................... 280/5.26 |
| 3,283,839 | A | | 11/1966 | Brown et al. |
| 3,497,227 | A | | 2/1970 | Procello |
| 3,497,228 | A | * | 2/1970 | Porcello .................... 280/5.26 |
| 4,200,161 | A | * | 4/1980 | Penington, Jr. .............. 180/8.2 |
| 4,645,222 | A | | 2/1987 | Hester |
| 4,770,429 | A | | 9/1988 | Freyman |
| 5,269,544 | A | | 12/1993 | Park |

FOREIGN PATENT DOCUMENTS

JP        10-29539   *  2/1998

* cited by examiner

Primary Examiner—Bryan Fischmann

(57) ABSTRACT

A stroller assembly includes a seat and a frame attached to the seat. A rear axle and a front axle is each mounted on the frame. A plurality of back wheels is rotatably attached to the rear axle. Each of a pair of hubs is rotatably coupled to one of a pair of free ends of the front axle. A plurality of arms is attached to and radially extends outwardly from each of the hubs. The arms on each of the hubs are positioned equidistant from each other. Each of a plurality of rods is attached to one of the arms such that each of the rods is orientated substantially perpendicular to a longitudinal axis of an associated one of the arms and parallel to a longitudinal axis of the front axle. At least one of a plurality of front wheels is rotatably coupled to each one of the rods.

4 Claims, 3 Drawing Sheets

STROLLER ASSEMBLY

BACKGROUND OF THE INVENTION

1. Field of the Invention

The present invention relates to stroller devices and more particularly pertains to a new stroller device for transporting a child or infant up a flight of stairs.

2. Description of the Prior Art

The use of stroller devices is known in the prior art. While these devices fulfill their respective, particular objectives and requirements, the need remains for an effective stroller for traveling up a flight of stairs. Current devices require the users of them to lift the stroller, along with a child or infant therein, up the flight of stairs.

SUMMARY OF THE INVENTION

The present invention meets the needs presented above by incorporating a spoked axle assembly having a plurality of wheels being attached to and spaced away from a hub. When a lead wheel reaches a stair, the hub rotates so that an upper most of the wheels moves onto the stair. This process continues until the assembly is moved up the entire flight of stairs.

To this end, the present invention generally includes a seat and a frame attached to the seat. A rear axle and a front axle is each mounted on the frame. A plurality of back wheels is rotatably attached to the rear axle. Each of a pair of hubs is rotatably coupled to one of a pair of free ends of the front axle. A plurality of arms is attached to and radially extends outwardly from each of the hubs. The arms on each of the hubs are positioned equidistant from each other. Each of a plurality of rods is attached to one of the arms such that each of the rods is orientated substantially perpendicular to a longitudinal axis of an associated one of the arms and parallel to a longitudinal axis of the front axle. At least one of a plurality of front wheels is rotatably coupled to each one of the rods.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
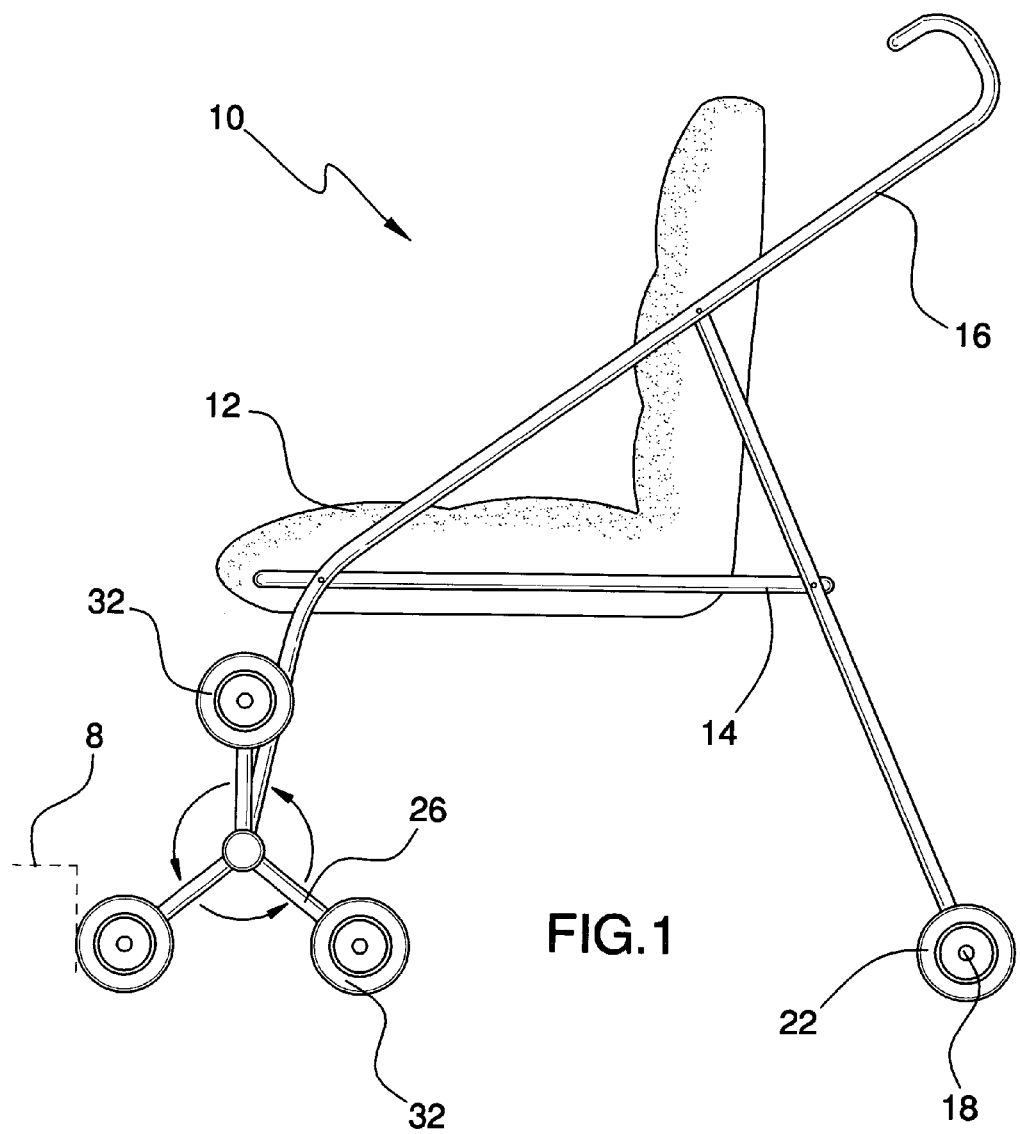
FIG. 1 is a schematic side view of a stroller assembly according to the present invention.
Figure 2:
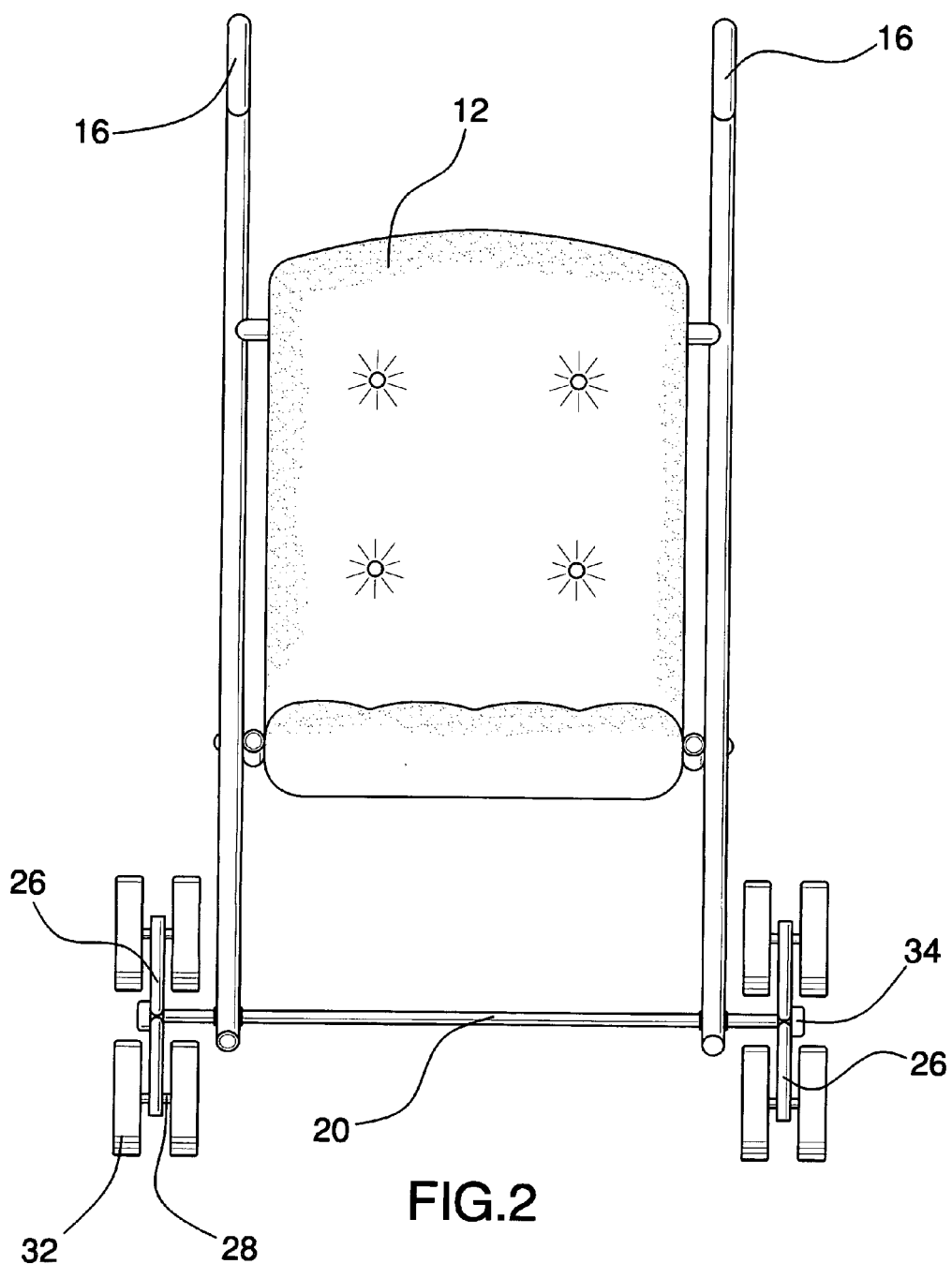
FIG. 2 is a schematic front view of the present invention.
Figure 3:
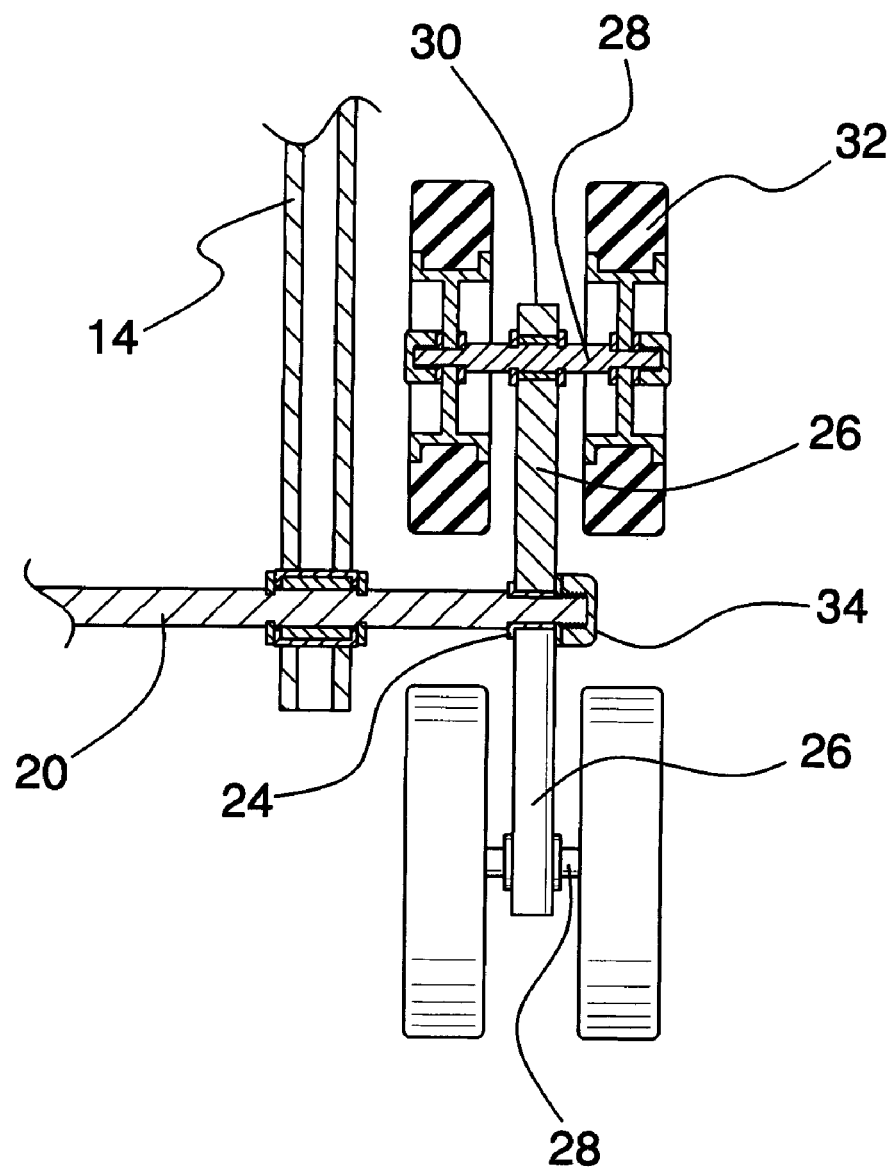
FIG. 3 is a schematic cross-sectional view of a hub of the present invention.

With reference now to the drawings, and in particular to FIGS. 1 through 3 thereof, a new stroller device embodying the principles and concepts of the present invention and generally designated by the reference numeral 10 will be described.

As best illustrated in FIGS. 1 through 3, the stroller assembly 10 generally includes a seat 12. The seat 12 is preferably cushioned and may or may not include a plurality of straps as safety restraints for holding a child in the seat 12. A frame 14 is attached to the seat 12. The frame 14 includes a pair of handles 16 attached to and extending behind and upwardly from the seat 12. A rear axle 18 and a front axle 20 are each mounted on the frame 14. Each of the rear 18 and front 20 axles are positioned generally below the seat 12. A plurality of back wheels 22 is rotatably attached to the rear axle 18.

Each of a pair of hubs 24 is rotatably coupled to one of a pair of free ends of the front axle 20. A plurality of arms 26 is attached to and radially extends outwardly from each of the hubs 24. The arms 26 on each of the hubs 24 are substantially equidistant from each other. The plurality of arms 26 preferably includes at least three arms 26 attached to each of the hubs 24, though four, five and six arms may also be used. Each of a plurality of rods 28 is attached to one of the arms 26 such that each of the rods 28 is orientated substantially perpendicular to a longitudinal axis of an associated one of the arms 26 and parallel to a longitudinal axis of the front axle 20. The rods 28 are preferably located adjacent to an outer end 30 of the arms 26 and preferable extend through the arms 26. A plurality of front wheels 32 is provided and rotatably attached to the rods 28. At least one front wheel 32 is rotatably coupled to each of the rods 28. Fasteners 34 may be threadably coupled to the front axle 20 for securing the hub 24 on the axle. This allow for the hubs 24 to be removed and a single front wheel assembly attached to opposite ends of the front axle 20.

In use, the assembly 10 is used as a conventional stroller. When the person pushing the assembly encounters a stair 8, the leading front wheel stops against the stair 8 so that the hub 24 rotates and the uppermost wheel moves onto the stair 8. This process continues with the next stair until the assembly 10 has been moved up the flight of stairs. This allows the assembly 10, and a child it may be carrying, to be moved up the stars without the person having to lift the stroller up the stairs.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A baby stroller device comprising:

a seat;

a frame being attached to said seat, a rear axle and a front axle each being mounted on said frame, a plurality of back wheels being rotatably attached to said rear axle, wherein one of said plurality of back wheels is located on an opposite side of said frame from another of said plurality of said back wheels;

a pair of hubs, each of said hubs being rotatably coupled to one of a pair of free ends of said front axle;

a plurality of arms being attached to and radially extending outwardly from each of said hubs, said arms being substantially equidistant from each other;

a plurality of rods, each of said rods being attached to one of said arms such that each of said rods is orientated substantially perpendicular to a longitudinal axis of an associated one of said arms and parallel to a longitudinal axis of said front axle; and a plurality of front wheels, each of said front wheels being rotatably coupled to one of said rods such that each of said rods has at least one front wheel rotatably coupled thereto.

2. The baby stroller device of claim 1, wherein said frame further includes a pair of handles being attached to and extends behind and upwardly from said seat.

3. The baby stroller device of claim 1, wherein said plurality of arms includes at least three arms attached to each of said hubs.

4. A baby stroller device comprising:

a seat;

a frame being attached to said seat, said frame including a pair of handles being attached to and extending behind and upwardly from said seat, a rear axle and a front axle each being mounted on said frame, each of said rear and front axles being positioned generally below said seat, a plurality of back wheels being rotatably attached to said rear axle, wherein one of said plurality of back wheels is located on an opposite side of said frame from another of said plurality of said back wheels;

a pair of hubs, each of said hubs being rotatably coupled to one of a pair of free ends of said front axle;

a plurality of arms being attached to and radially extending outwardly from each of said hubs, said arms being substantially equidistant from each other, said plurality of arms including at least three arms attached to each of said hubs;

a plurality of rods, each of said rods being attached to one of said arms such that each of said rods is orientated substantially perpendicular to a longitudinal axis of an associated one of said arms and parallel to a longitudinal axis of said front axle; and a plurality of front wheels, each of said front wheels being rotatably coupled to one of said rods such that each of said rods has at least one front wheel rotatably coupled thereto.

* * * * *